(12) United States Patent
Fukuwa

(10) Patent No.: US 7,117,547 B2
(45) Date of Patent: Oct. 10, 2006

(54) GOGGLES

(75) Inventor: Yasuo Fukuwa, Kanagawa (JP)

(73) Assignee: PENTAX Corporation, Tokyo (JP)

( * ) Notice: Subject to any disclaimer, the term of this patent is extended or adjusted under 35 U.S.C. 154(b) by 27 days.

(21) Appl. No.: 10/653,134

(22) Filed: Sep. 3, 2003

(65) Prior Publication Data
US 2004/0040069 A1   Mar. 4, 2004

(51) Int. Cl.
*A61F 9/02* (2006.01)
(52) U.S. Cl. .......................................................... 2/431
(58) Field of Classification Search .................. 351/44, 351/47; 2/6.3, 6.7, 13, 15, 430, 434, 447, 2/431, 432, 433, 439
See application file for complete search history.

(56) References Cited

U.S. PATENT DOCUMENTS

| 4,976,530 A | * | 12/1990 | Mackay et al. ............... 351/44 |
| 5,412,438 A | * | 5/1995 | Bolle' ......................... 351/44 |
| 5,943,114 A | | 8/1999 | Grendelmeier |
| 6,116,731 A | | 9/2000 | Fuchs |
| 6,149,268 A | * | 11/2000 | Hall et al. ..................... 351/62 |

* cited by examiner

*Primary Examiner*—Danny Worrell
(74) *Attorney, Agent, or Firm*—Greenblum & Bernstein, P.L.C.

(57) ABSTRACT

Goggles include a goggles frame and a goggles lens. A mounting member is provide data central portion which connects a left lens which is positioned at the left eye side of a user and a right lens which is positioned at the right eye side of the user. The goggles lens is rotatably mounted on goggles lens supporting portion of the goggles frame by the mounting member. A radius of curvature of facing surfaces of the left and right lenses, and a radius of curvature of the central portion, in the horizontal direction, are set to approximately 250 millimeters. A radius of curvature of the side curving surfaces of the left and right lenses, which are positioned at the sides of the user's face, in the horizontal direction, is set to approximately 25 millimeters. A radius of curvature of the facing surfaces of the left and right lenses in the vertical direction is set to approximately 60 millimeters.

8 Claims, 7 Drawing Sheets

GOGGLES

BACKGROUND OF THE INVENTION

1. Field of the Invention

The present invention relates to goggles which are worn while, for example, playing sport, and which are used with a spectacles frame which is provided with positive or negative lenses.

2. Description of the Related Art

Conventionally, goggles are worn while playing sport, in order to protect the eyes from snow, dust, sunshine, and the like. The lenses of the goggles are manufactured first by forming an intermediate product that has spherical surfaces from glass material, and then shaping the intermediate product into a lens or lenses. The reason why this process is used is to facilitate manufacturing, reduce cost, and so on.

Some myopic or hyperopic people are not able to wear contact lenses since contact lenses are not good for their eyes. Such people are forced to wear the goggles with spectacles for correcting their myopia or hyperopia. Therefore, a frame in which lenses for correcting visual acuity are provided is mounted on the goggles as an inner frame. The inner frame is curved to some extent in accordance with the spherical surface of the goggles, and is attachably and detachably mounted at the side of the goggles, which is closer to the face of the user.

Generally, it is preferable that the optical axes of the right and left lenses of the spectacles for correcting visual acuity are respectively coaxial with the optical axes of the right and left eyes. However, it is difficult to accord the optical axes of the lenses with the optical axes of the eyes due to the movement of the pupils. Accordingly, the spectacles frame is shaped such that the lenses are parallel to the user's face when the spectacles are worn by the user.

However, since the above-mentioned inner frame is curved in accordance with the spherical surface of the goggles, the user can not see well. Accordingly, if the lenses for correcting myopia are provided in the inner frame, the axes of the lenses are decentered outwards by a predetermined distance, and if the lenses for correcting hyperopia are provided in the inner frame, the axes of the lenses are decentered inwards by a predetermined distance.

With this inner frame, when the pupils of the user are directed straight ahead, the user can obtain a good field of view. However, when the pupils are directed in the right and left directions, a good field of view cannot be obtained. For example, when the pupils are directed in the left direction, the center of a line which extends from the right eye passes through the right lens at a peripheral portion adjacent to the center of the inner frame, and the center of a line which extends from the left eye passes through the left lens at an outer peripheral portion. Then, the angles at which the lines, extending from the right and left eyes, are incident on the corresponding lens, are largely different. Accordingly, the inner frame cannot function well as an element for correcting visual acuity.

SUMMARY OF THE INVENTION

Therefore, an object of the present invention is to obtain a good field of vision for goggles which are provided with the inner frame for correcting visual acuity.

In accordance with an aspect of the present invention, there is provided goggles on which a frame including lenses for correcting visual acuity can be attachably and detachably mounted, comprising a lens system that includes a pair of facing surfaces which faces the front of a user's face and a pair of side curving surfaces which is positioned adjacent to the sides of said user's face. The lens system has: a first radius of curvature of the pair of facing surfaces, the first radius of curvature being in the horizontal direction in a state where the user wears the goggles in a usual posture; a second radius of curvature of the pair of side curving surfaces, the second radius of curvature being in said horizontal direction, in the state; and a third radius of curvature of the pair of facing surfaces, the third radius of curvature being in the vertical direction in the state. The first radius of curvature, the second radius of curvature, and the third radius of curvature are different.

The first radius of curvature is set such that the pair of facing surfaces are approximately parallel to the front of the user's face, and the second radius of curvature and the third radius of curvature are set such that light can be prevented from directly entering the eyes of the user and foreign substances can be prevented from entering the user's eyes.

Preferably, the first radius of curvature is greater than or equal to approximately 200 millimeters, the second radius of curvature is between approximately 15 millimeters and 30 millimeters, and the third radius of curvature is between approximately 50 and 100 millimeters.

More preferably, the first radius of curvature is set to approximately 250 millimeters, the second radius of curvature is set to approximately 25 millimeters, and the third radius of curvature is set to approximately 60 millimeters.

Further, preferably, the facing surfaces and the side curving surfaces are composed of more than three different curves which are continuous.

According to the present invention, the curvatures of the pair of the facing surfaces of the lens, are formed to be approximately parallel to the user's face. Accordingly, a spectacles frame (inner frame), which meets optical requirements similar to those of usual spectacles for correcting visual acuity, can be mounted on the goggles, and when the goggles are used with the spectacles for correcting visual acuity, a good field of vision can be obtained.

Further, the curvature of the side curving surfaces in the horizontal direction and the curvature of the facing surfaces in the vertical direction are different from the curvature of the facing surfaces in the horizontal direction. These curves are formed so as to be able to prevent light and foreign substances from entering from the side curving surfaces and the facing surfaces. Accordingly, the function of the goggles of protecting the user's eyes is maintained.

BRIEF DESCRIPTION OF THE DRAWINGS

The objects of the present invention will be better understood from the following description, with reference to the accompanying drawings, in which.

DESCRIPTION OF THE PREFERRED EMBODIMENTS

Figure 1:
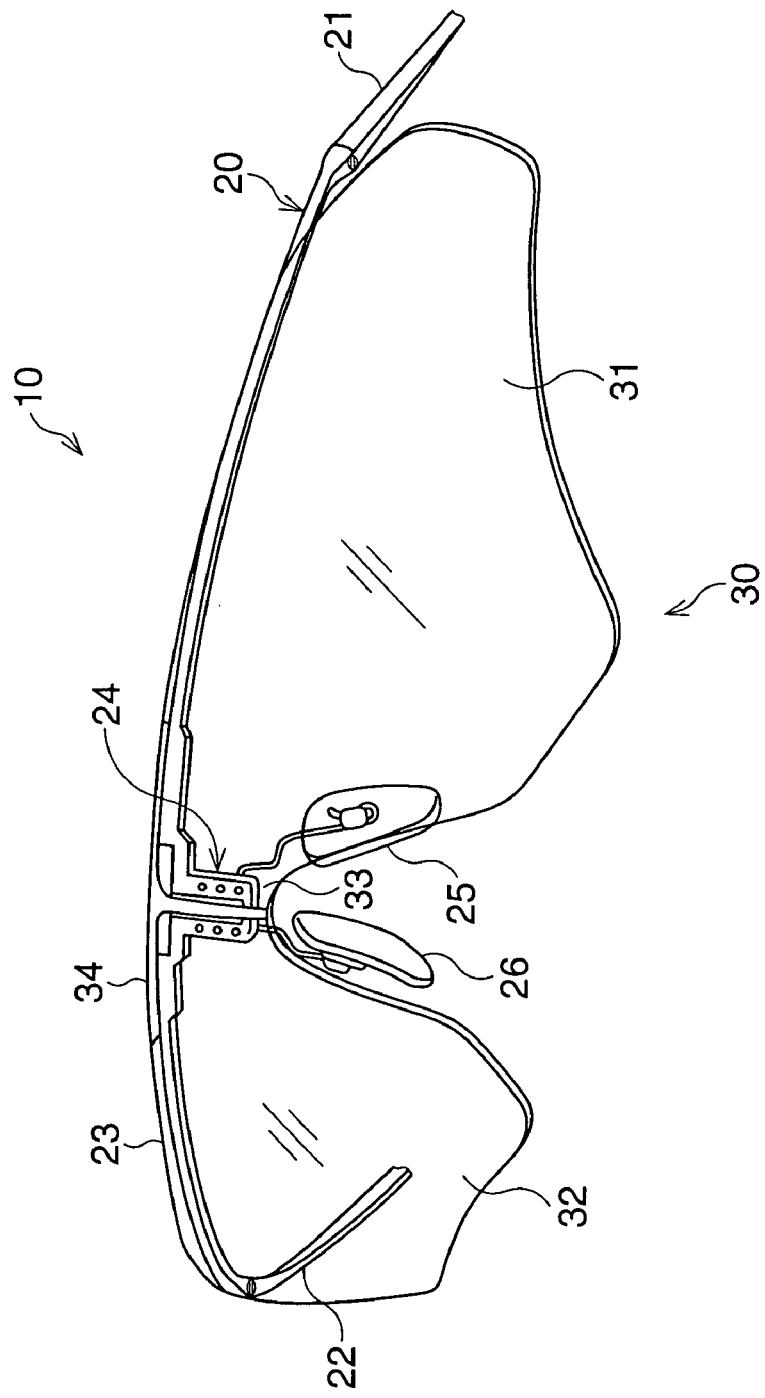
FIG. 1 is a perspective view of the goggles to which an embodiment according to the present invention is applied.

The present invention will now be described with reference to an embodiment shown in the drawings.

Figure 2:
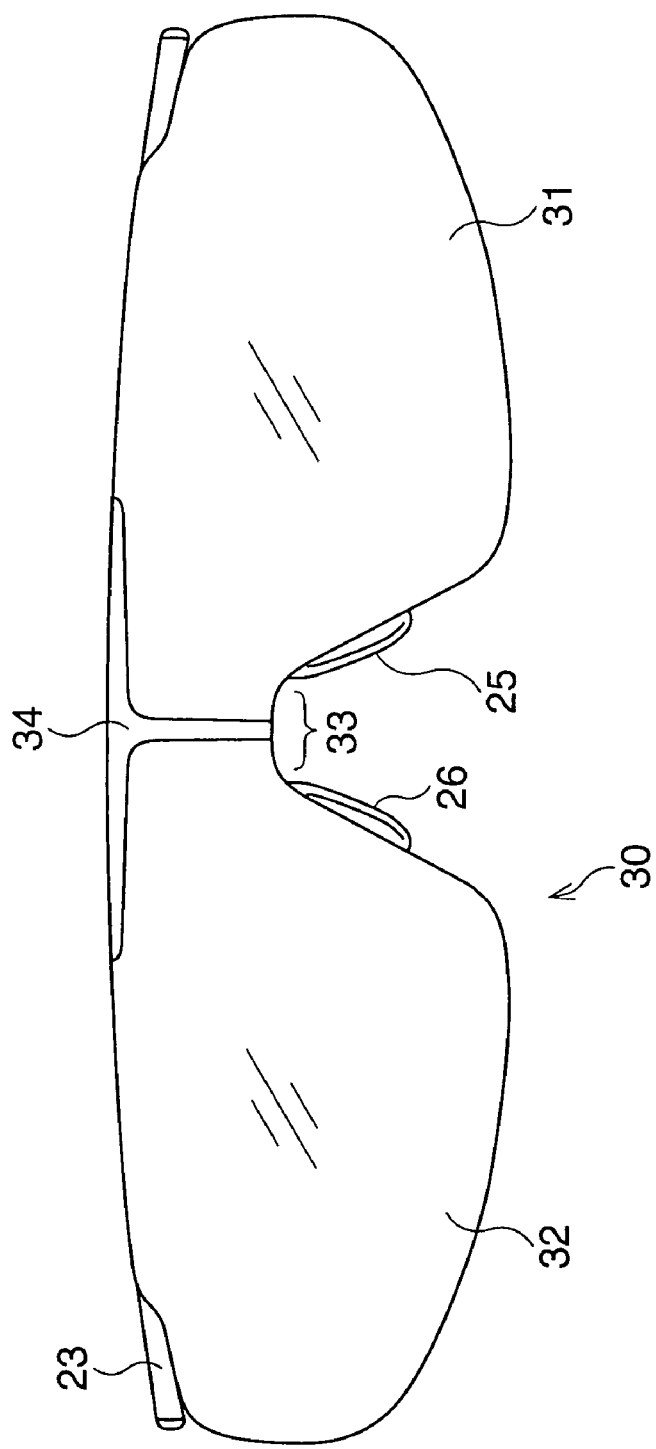
FIG. 2 is a front view of the goggles.
Figure 3:
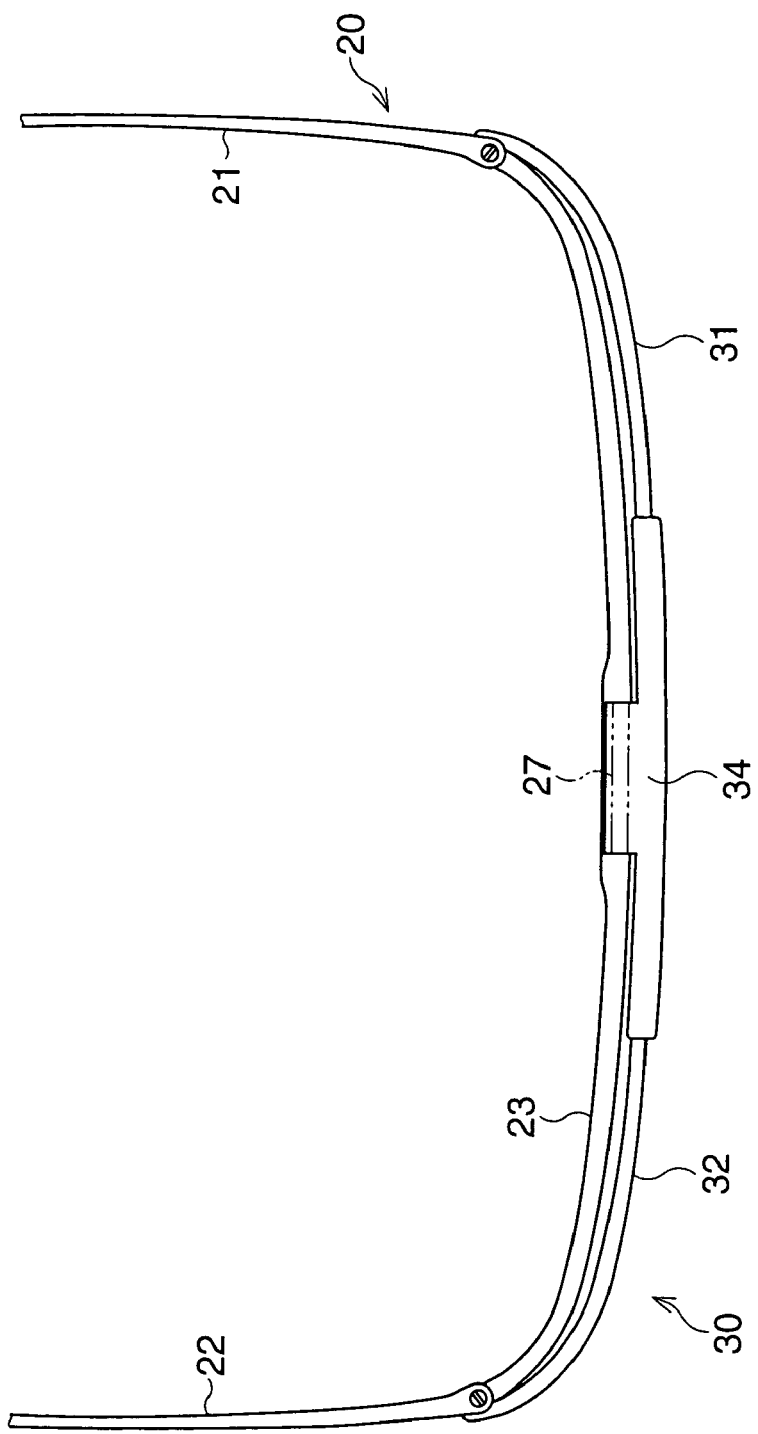
FIG. 3 is a plane view of the goggles.

FIG. 1 is a perspective view of goggles to which an embodiment according to the present invention is applied. FIG. 2 is a front view of the goggles, and FIG. 3 is a plane view of the goggles. Note that, in FIG. 1, some members are depicted as see-through in order to make the structure of the goggles clearer. The goggles 10 include a goggles frame 20 and goggles lens system 30. The goggles frame 20 includes a pair of temples 21 and 22, and a lens supporting portion 23. The supporting portion 23 is a wire-shaped member, being connected at its end portions through hinges with the pair of temples 21 and 22.

As shown in FIG. 1, a nose pad-supporting portion 24 is provided at the center of the goggles lens-supporting portion 23. The nose pad supporting portion 24 extends downwards. A pair of nose pads 25 and 26 is mounted on the nose pad supporting portion 24. Further, spectacles for correcting visual acuity, described below, can be attachably and detachably mounted on the nose pad supporting portion 24.

As shown in FIGS. 1 and 2, the goggles lens system 30 is a one lens type system, in which a left lens 31 and a right lens 32 are unitarily formed. Note that, when the user wears the goggles 10, the left lens 31 is located at the side of the user's left eye and the right lens 32 is located at the side of the user's right eye. The left and right lenses 31 and 32 are connected by a central portion 33 of the goggles lens system 30. Amounting member 34, for mounting the goggles lens system 30 on the supporting portion 23, is provided at the central portion 33.

In the goggles lens supporting portion 23, a recess is formed above the nose pad supporting portion 24. A supporting shaft 27 (see FIG. 3) is provided in the recess along the axis of the supporting portion 23. The goggles lens system 30 is mounted on the supporting shaft 27 through the mounting member 34, being supported so as to be rotatable around the axis of the supporting shaft 27. Accordingly, the goggles lens system 30 can be flipped upwards, namely in the direction away from the user's face.

Note that, in FIGS. 2 and 3, some members are omitted in order to avoid excess complexity of the drawings. Further, in FIG. 3, only the upper end side of the goggles lens system 30 is depicted.

Figure 4:
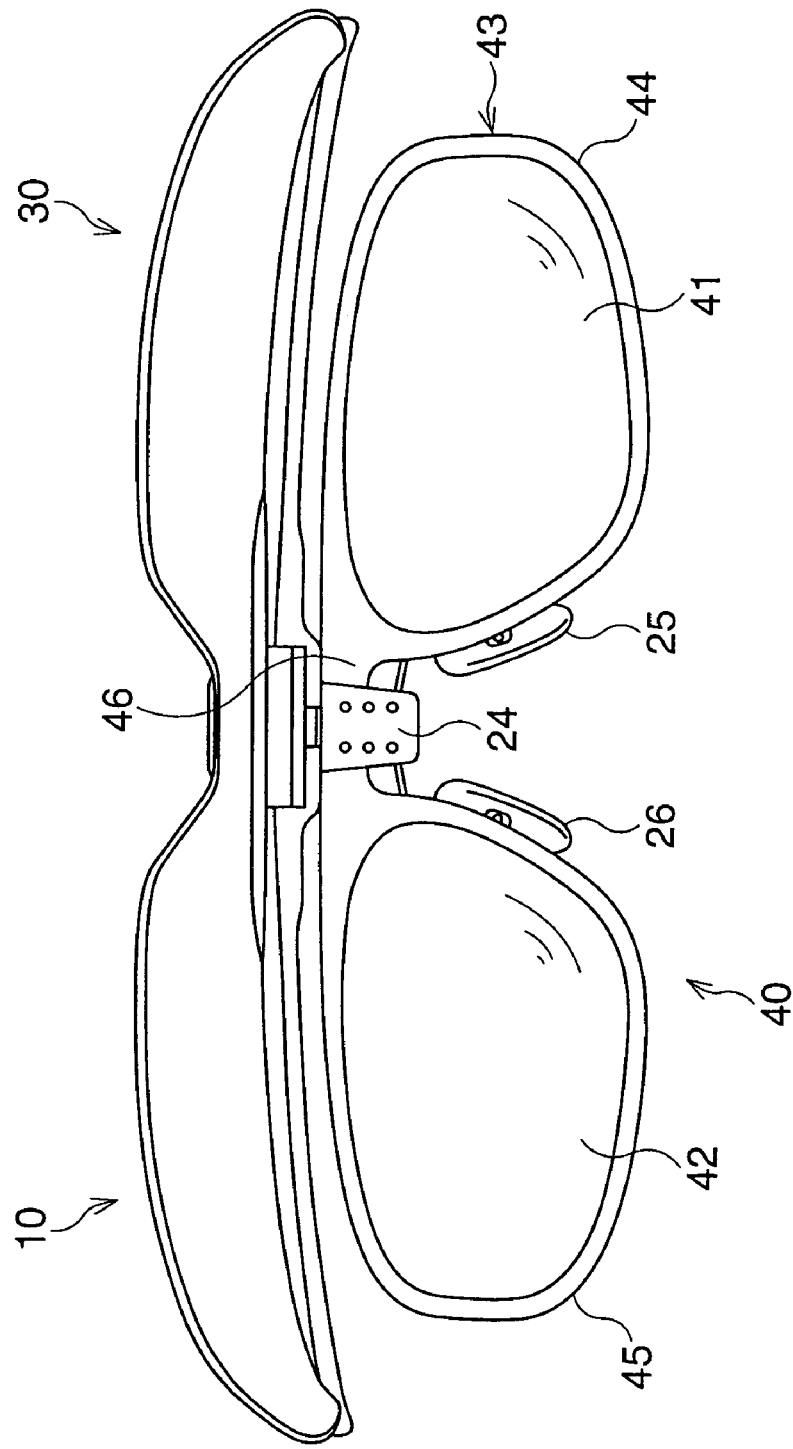
FIG. 4 is a front view of the goggles in a state where spectacles for correcting visual acuity are mounted on the goggles and the goggles lenses are flipped upwards.

FIG. 4 is a front view of the goggles 10 in a state where spectacles for correcting visual acuity 40 are mounted on the goggles 10 and the goggles lens system 30 is flipped upwards. The correcting spectacles 40 include a pair of lenses 41 and 42 for correcting visual acuity, and a frame 43. The frame 43 includes rims 44 and 45, and a connecting portion 46 which connects the rims 44 and 45. The lens 41 is held by the rim 44 and the lens 42 is held by the rim 45. The rims 44 and 45, and the connecting portion 46 are unitarily formed. The correcting spectacles 40 are attachably and detachably mounted on the nose pad supporting portion 24 through the connecting portion 46.

Figure 5:
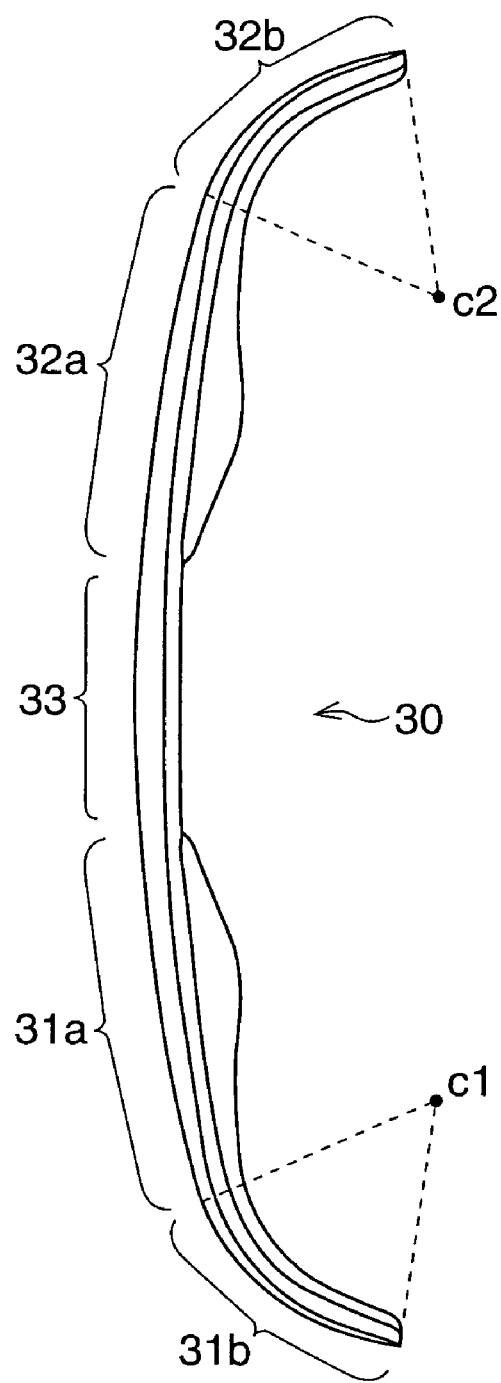
FIG. 5 is a plane view of the goggles lenses.

FIG. 5 is a plane view of the goggles lens system 30. In the goggles lens system 30, a facing surface 31a of the left lens 31 and a facing surface 32a of the right lens 32 are formed so as to be approximately parallel to the front of the user's face in the horizontal direction. The facing surface 31a of the left lens 31 faces the left eye of the user, and is the portion of the lens 31 between the outside end of the rim 44 of the above-mentioned correcting spectacles 40 and the central portion 33. Similarly, the facing surface 32a of the right lens 32 faces the right eye of the user, and is the portion of the lens 32 between the outside end of the rim 45 of the correcting spectacles 40 and the central portion 33. Note that, the horizontal direction is the horizontal direction in a state where the user wears the goggles 10 in a usual posture, and corresponds to the lateral direction of FIGS. 2 through 4.

In order to make the facing surfaces 31a and 32a approximately parallel to the front of the user's face in the horizontal direction, it is preferable that a radius of curvature (first radius of curvature) of a portion composed of the facing surfaces 31a and 32a and the central portion 33, in the horizontal direction, is set to be greater than or equal to approximate 200 millimeters. In this embodiment, this radius of curvature is set to approximate 250 millimeters.

Further, the left and right lenses 31 and 32 are formed so as to be able to prevent light and foreign substances from entering from the area adjacent to the sides of the user's face or the space below the left and right eyes. In order to prevent light and foreign substances from directly entering from the space adjacent to the sides of the user's face, it is preferable that a horizontal radius of curvature (second radius of curvature) of a side curving portion 31b of the left lens 31 and a side curving portion 32b of the right lens 32, is set to between approximately 15 millimeters and 30 millimeters. In this embodiment, the horizontal radius of curvature for both the side curving portion 31b and the side curving portion 32b is set to approximately 25 millimeters. The center of curvature of the side curving portion 31b is a point c1, and the center of curvature of the side curving portion 32b is a point c2.

Note that, the side curving portion 31b exists between a portion corresponding to the outside end of the rim 44 of the correcting spectacles 40 and the side end of the left lens 31, and the side curving portion 32b exists between a portion corresponding to the outside end of the rim 45 of the correcting spectacles 40 and the side end of the right lens 32.

Figure 6:
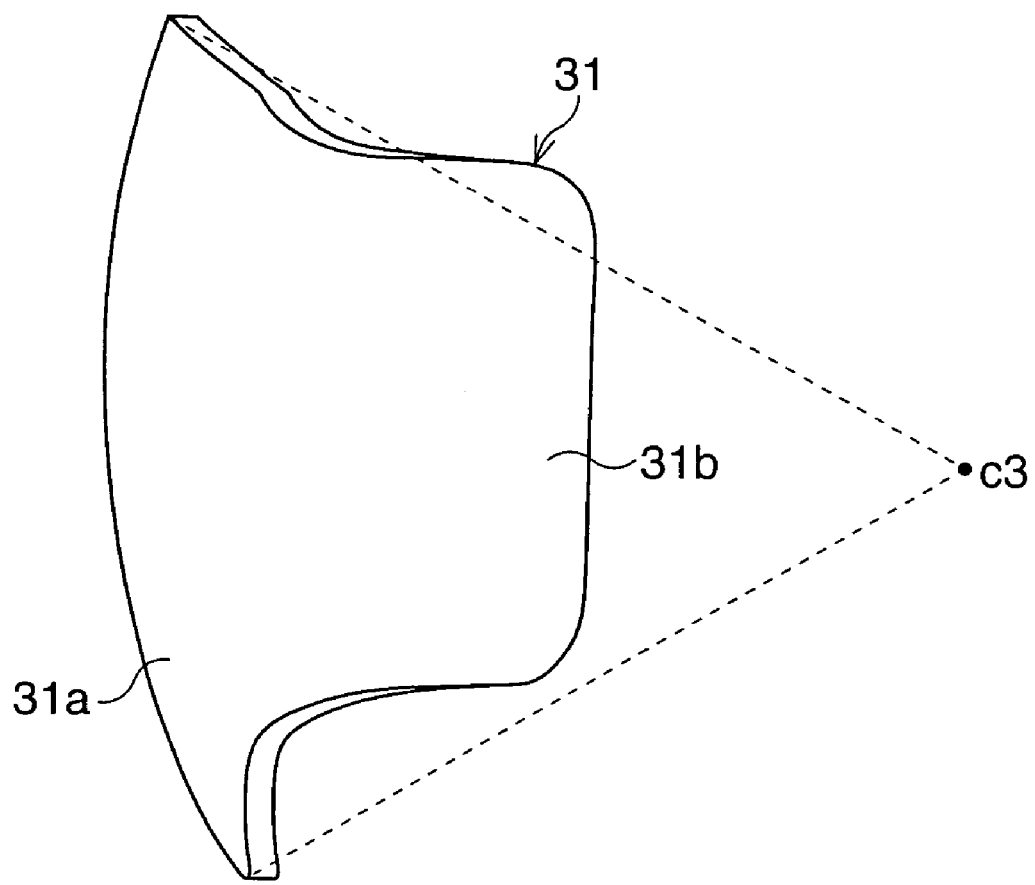
FIG. 6 is a side view of a left lens of the goggles.

FIG. 6 is a side view of the left lens 31 of the goggles lens system 30. In FIG. 6, the lens 31 is enlarged, compared with the drawing of FIG. 5. In order to prevent light and foreign substances from entering from the space below the user's left eye, it is preferable that the radius of curvature (third radius of curvature) of the facing surface 31a of the left lens 31 in the vertical direction is set to between approximately 50 and 100 millimeters. In this embodiment, this radius of curvature is set to approximately 60 millimeters. The center of curvature is a point c3.

In order to prevent light and foreign substances from entering from the space below the user's right eye, a radius of curvature (third radius of curvature) of the facing surface 32a of the right lens 32, in the vertical direction, is set similarly to that for the facing surface 31a. Note that, in this specification, the vertical direction is a vertical direction in a state where the user wears the goggles 10 in a usual posture, and corresponds to the longitudinal direction of FIGS. 2 through 4.

Figure 7:
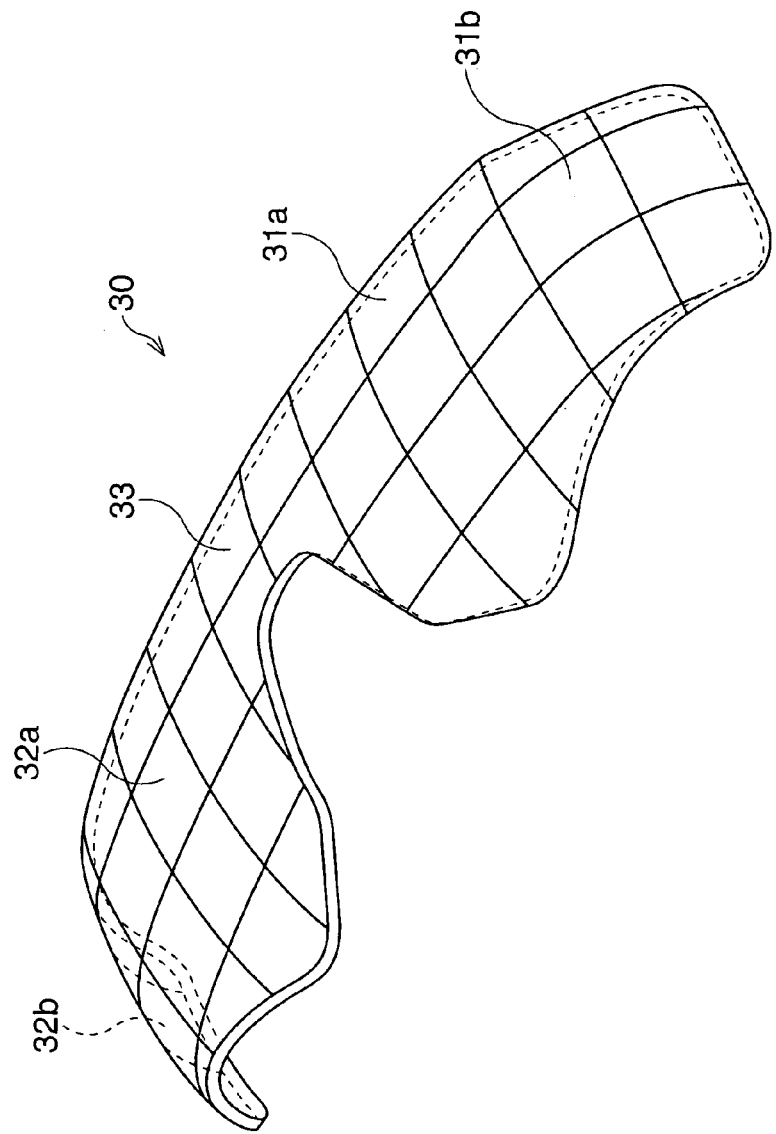
FIG. 7 is a perspective view showing only the goggles lenses.

FIG. 7 is a perspective view showing only the goggles lens system 30. In FIG. 7, lines are depicted to indicate the curvature of the surface of the object side (the side opposite to the side facing to the user's eye). As shown in FIG. 7, the facing surfaces 31a and 32a, the side curving surfaces 31b and 32b, and the central portion 33 are composed of more than three curves. These curves are continuous and the radius of curvature for each of them is different.

As described above, according to this embodiment, the goggles lens system 30 is composed of the three continuous and different curves. Accordingly, the correcting spectacles 40 can be mounted in such a manner that the optical axes of the lenses 41 and 42 are respectively parallel with the lines of sight extending from the left and right eyes when the pupils of the user are directed straight ahead. Further, the goggles lens system 30 can prevent dust, rain, snow, and soon from entering, and prevent light from directly entering. Namely, the optical characteristics of the correcting spectacles 40 can be sufficiently maintained, without lowering the functionality of the goggles 10.

Further, according to this embodiment, a distance between the lenses 31 and 32 of the goggles 10 and the lenses 41 and 42 of the correcting spectacles 40 is shortened, compared with the combination of goggles which are sphere and correcting spectacles which are approximately parallel to the user's face. Accordingly, a good field of vision can be obtained.

Note that, in this embodiment, a one lens type system in which the left and right lenses 31 and 32 are unitarily formed is used for explanation, however, the embodiment can be applied to goggles having two lenses; namely the left and right lenses are separated.

As described above, according to the present invention, the optical characteristics of the inner frame for correcting visual acuity, which is mounted on the goggles can be sufficiently maintained, without lowering the functionality of the goggles.

The present disclosure relates to subject matter contained in Japanese Patent Application No. P2002-166561 (filed on Jun. 7, 2002) which is expressly incorporated herein, by reference, in its entirety.

The invention claimed is:

1. Goggles on which a frame including lenses for correcting visual acuity can be attachably and detachably mounted, the goggles comprising a lens system that includes a pair of facing surfaces which face a front of a user's face and a pair of side curving surfaces which are positioned adjacent to the sides of the user's face, said lens system comprising: a first radius of curvature of said pair of facing surfaces, said first radius of curvature extending in a horizontal direction when the user wears said goggles in a usual posture; a second radius of curvature of said pair of side curving surfaces, said second radius of curvature extending in the horizontal direction; and a third radius of curvature of said pair of facing surfaces, said third radius of curvature extending in a vertical direction when the user wears said goggles in a usual posture, said first radius of curvature, said second radius of curvature, and said third radius of curvature being different from each other, wherein said first radius of curvature is greater than or equal to approximately 200 millimeters, said second radius of curvature is between approximately 15 millimeters and 30 millimeters, and said third radius of curvature is between approximately 50 and 100 millimeters, and wherein said first radius of curvature is set such that said pair of facing surfaces are approximately parallel to the front of the user's face, and said second radius of curvature and said third radius of curvature are set such that light can be prevented from directly entering the eyes of said user and foreign substances can be prevented from entering the user's eyes.

2. Goggles according to claim 1, wherein said first radius of curvature is approximately 250 millimeters, said second radius of curvature is approximately 25 millimeters, and said third radius of curvature is approximately 60 millimeters.

3. Goggles according to claim 1, wherein said facing surfaces and said side curving surfaces are composed of more than three different curves which are continuous with each other.

4. Goggles according to claim 1, each side curving surface configured to extend in a direction to close a gap between an edge of the visual acuity correcting lens and the user's face.

5. Goggles according to claim 1, said first radius of curvature being larger than said second radius of curvature and than said third radius of curvature, and said third radius of curvature being larger than said second radius of curvature.

6. Goggles on which a frame including visual acuity correcting lenses can be attachably and detachably mounted, the goggles comprising a lens system that includes a pair of facing surfaces which face a front of a user's face and a pair of side curving surfaces which are positioned adjacent to the sides of the user's face, the pair of facing surfaces comprising a facing surface for each of a right eye and a left eye of a user, a first direction being defined by a direction of spacing between the facing surfaces of the pair of facing surfaces, said lens system comprising a first radius of curvature of said pair of facing surfaces, said first radius of curvature extending in the first direction; a second radius of curvature of said pair of side curving surfaces, said second radius of curvature extending in the first direction, and a third radius of curvature of said pair of facing surfaces, said third radius of curvature extending in a direction transverse to the first direction, wherein said first radius of curvature is greater than or equal to approximately 200 millimeters, said second radius of curvature is between approximately 15 millimeters and 30 millimeters, and said third radius of curvature is between approximately 50 and 100 millimeters, and said first radius of curvature, said second radius of curvature and said third radius of curvature having different values from each other.

7. Goggles according to claim 6, said second radius of curvature being configured such that light and foreign substances can be prevented from entering the eyes of the user from the sides of the user's face and the third radius of curvature being configured such that light and foreign substances can be prevented from entering the eyes of the user from above and below the user's eyes.

8. Goggles according to claim 6, said first radius of curvature being larger than said second radius of curvature and than said third radius of curvature and said third radius of curvature being larger than said second radius of curvature.

* * * * *